United States Patent Office 2,946,743
Patented July 26, 1960

2,946,743

STABILIZATION OF LUBRICATING OILS IN THE PRESENCE OF A NICKEL-ALUMINA CATALYST AND HYDROGEN

John Arthur Edgar Moy and Alan Arthur Yeo, both of Sunbury-on-Thames, England, assignors to The British Petroleum Company Limited, London, England, a British joint-stock corporation No Drawing. Filed May 27, 1957, Ser. No. 661,608

4 Claims. (Cl. 208—264)

This invention relates to the production of lubricating oils from petroleum feedstocks.

In the production of lubricating oils from petroleum feedstocks, it is customary for the oils to be given a treatment with clay in order to improve their color and oxidation stability. In the case of oils derived from Middle Eastern crude oils, this clay treatment is given to the dewaxed and solvent-refined oil. The clay treatment is expensive and the disposal of spent clay is a problem. The principal object of the present invention is to provide an alternative process for achieving the same results as the clay treatment while avoiding its disadvantages.

According to the present invention, a lubricating oil is improved with respect to color and oxidation stability by contacting the oil in the presence of hydrogen, at a temperature of 150 to 430° C. and a pressure of 50 to 800 p.s.i.g., with a catalyst consisting of a base prepared by impregnating an amphoteric oxide with a solution, preferably an aqueous solution, of a compound of nickel, cobalt or iron, preferably nickel, decomposable under heat to the oxide, and thereafter roasting the impregnated oxide at a temperature above 650° C., said base having been further impregnated with an aqueous solution of a compound of nickel, cobalt or iron, preferably nickel, decomposable under heat to the oxide, and roasted at a temperature in the range 350 to 650° C., preferably at about 500° C.

Advantageously the compound of nickel, cobalt or iron both in the preparation of the base and in the impregnation of the base, is the nitrate, formate or acetate.

Alumina is the preferred amphoteric oxide.

Before use, the catalyst may be reduced by means of a gas containing free hydrogen, and preferably the catalyst is reduced by hydrogen at a temperature in the range 350 to 600° C. and preferably at about 500° C. Preferably the period of treatment with hydrogen is 2 to 48 hours.

Some lubricating oils, particularly those derived from Middle Eastern crude oils, contain a relatively high proportion of sulfur, of the order of 1 to 2.5% by weight, and it has been found that the hydrogen treatment of such oils must not be carried out under conditions that would result in substantial removal of sulfur since this has the effect of lowering the viscosity of the oil to too great an extent. In particular, the use of temperatures in excess of 320° C. should be avoided.

The invention will now be described with reference to the following example.

Example

A catalyst base was prepared by adding nickel nitrate solution to a wet alumina gel (derived from aluminum-isopropoxide by hydrolysis) and drying at 140° C. The dried gel was broken up to fines, pelleted; broken, sieved to 4–8 BSS mesh and calcined at 900° C. for 2 hours. This catalyst base had a nickel content of 27% wt.

Further nickel was impregnated on this base by immersing the catalyst base at 110° C. for ½-hour in a solution consisting of 405 g. nickel nitrate and 200 ml. water, removing the excess solution by filtration, drying at 140° C. and calcining at 500° C. for 1½ hours. The total nickel content of the finished catalyst was ca. 33% wt.

The catalyst was pretreated before use by heating at 500° C. for 16 hours in a stream of hydrogen.

A Middle East brightstock, which had not been subjected to clay treatment, was processed over the reduced catalyst described above at 100 p.s.i.g., 316° C., 1 v./v./hr., and 1000 s.c.f./b. hydrogen recycle rate. Inspection data on the feedstock and product are set out in the following table.

| | Feedstock | Product |
|---|---|---|
| Specific gravity 60°/60° F | 0.9055 | |
| Color—ASTM | 4 | 3 |
| Color—Klett (Standard=3 ASTM)[1] | 2.5 | 0.94 |
| Flash point (closed) °F | 570 | 560 |
| Kin. visc. at 100° F cs | 573 | 522 |
| Carbon residue (Rams) percent wt | 0.47 | 0.48 |
| BAM oxidation stability test: | | |
| Kin. visc. at 100° F cs | 854.7 | 689 |
| Viscosity ratio | 1.49 | 1.32 |
| Carbon residue (Rams) percent wt | 1.59 | 1.12 |
| Carbon residue increase percent wt | 1.12 | 0.64 |

[1] The Klett Color Test has the ASTM Designation D 155-45T.

We claim:

1. A method of treating a lubricating oil to improve its color and oxidation stability comprising contacting the oil in the presence of hydrogen at a temperature of 150 to 430° C. and a pressure of 50 to 800 p.s.i.g. with a catalyst, said catalyst being a nickel-alumina base impregnated with nickel, said catalyst having been prepared by impregnating aluminum oxide with a solution of a nickel compound, said nickel compound being decomposable under heat to the nickel oxide thereof, roasting the impregnated aluminum oxide at a temperature above 650° C. to form said nickel-alumina base, impregnating said nickel-alumina base with a solution of a nickel compound, said nickel compound being decomposable under heat to the oxide thereof, and roasting the impregnated nickel-alumina base at a temperature of 350 to 650° C. to obtain said nickel-alumina base impregnated with nickel.

2. A method in accordance with claim 1 wherein the nickel compound employed in both impregnations is a salt selected from the group consisting of nickel nitrate, nickel formate and nickel acetate.

3. A method in accordance with claim 1 wherein said catalyst before being contacted with the lubricating oil is reduced by contacting same with a gas containing free hydrogen at a temperature in the range of about 350 to 600° C.

4. A method in accordance with claim 1 wherein the lubricating oil to be treated has a high sulfur content between 1 to 2.5% by weight and the contacting temperature is between about 150 to 320° C.

References Cited in the file of this patent

UNITED STATES PATENTS

| 2,706,167 | Harper et al. | Apr. 12, 1955 |
| 2,746,907 | Hanson | May 22, 1956 |
| 2,776,244 | Sowerwine | Jan. 1, 1957 |
| 2,813,837 | Holden | Nov. 19, 1957 |